United States Patent [19]

Powell

[11] Patent Number: 5,046,525
[45] Date of Patent: Sep. 10, 1991

[54] DIFFERENTIAL LOADING FLUID CHECK VALVE

[75] Inventor: Douglas H. Powell, El Macero, Calif.

[73] Assignee: Ames Company, Inc., Woodland, Calif.

[21] Appl. No.: 538,716

[22] Filed: Jun. 15, 1990

[51] Int. Cl.$^5$ ............................................. F16K 15/03
[52] U.S. Cl. .................................... 137/512; 137/527; 137/531
[58] Field of Search ................ 137/512, 530, 531, 527

[56] References Cited

U.S. PATENT DOCUMENTS

| | | |
|---|---|---|
| 2,503,424 | 4/1950 | Snyder . |
| 2,706,488 | 4/1966 | Harrington . |
| 3,478,778 | 11/1969 | Curtiss ............................ 137/531 X |
| 3,789,874 | 2/1974 | Hills ................................ 137/531 X |
| 4,054,153 | 10/1977 | Guyton . |
| 4,232,704 | 11/1980 | Becker et al. . |
| 4,284,097 | 8/1981 | Becker et al. . |

Primary Examiner—Robert G. Nilson
Attorney, Agent, or Firm—Lothrop & West

[57] ABSTRACT

A differential loading fluid check valve, including a unitized valve body having a single service port in its sidewall for selective access to the interior chamber of the check valve. Check valve subassemblies are installed and removed through the service port for valve assembly and service. The same valve body can be configured for either single or double check valve operation by adding or removing check valve subassemblies. Each check valve subassembly includes a base with an aperture, a pivotally mounted clapper, and an overlying pivotally mounted cam arm, spring biased against the movable end of the clapper. An arcuate surface on the cam arm is engaged by the clapper as it moves from a closed position to an open position, providing a beneficial differential reduction in the pressure drop, or loading, through the check valve.

18 Claims, 6 Drawing Sheets

DIFFERENTIAL LOADING FLUID CHECK VALVE

BACKGROUND OF THE INVENTION

1. Field of the Invention

The invention relates generally to check valves for preventing the backflow, or reverse flow, of fluid into a supply source. More specifically, the invention relates to a unibody, or unitized check valve body construction, capable of being configured for either single or double check valve operation. Internally mounted check valve subassemblies, each including a base with an aperture, a clapper, and a spring loaded cam arm for engagement with the clapper, provide improved fluid pressure loss characteristics, over the working pressure range of the valve.

In the double check valve configuration, the valve body of the present invention may also be fitted with a pressure actuated relief valve, providing a backflow preventer acceptable for use in the most demanding applications, including toxic fluids.

2. Prior Art

Examples of unitized check valve body construction include U.S. Pat. Nos. 4,232,704 and 4,284,097 issued to Becker, et al. In U.S. Pat. No. 4,054,153, granted to Guyton, a check valve is disclosed using a gravity actuated pivotal clapper, suspended by a clapper hanger provided in the valve body. U.S. Pat. No. 2,706,488, issued to Harrington, shows a multi-sectional back flow preventer, claiming the characteristic of providing a relatively low pressure drop during maximum flow conditions.

SUMMARY OF THE INVENTION

The check valve of the present invention employs a unitized valve body construction which can be configured or modified at any time for either single or double check valve operation. A single service port, having a removable cover, is provided in the sidewall of the valve body. Through this service port, check valve subassemblies are installed and removed, for assembling, servicing, or reconfiguring the check valve. It is preferable to fabricate the valve body from stainless steel, as it lends itself well to the unitized construction and is resistant to rust, corrosion, and the deleterious effects of deionized water.

The check valve subassemblies are self contained, and modular in nature. That is to say, each of the subassemblies includes all of the structural elements necessary for check valve operation in a single, standardized unit. The subassemblies are further provided with detachable coupling means, for ready installation and removal of the subassemblies into and from the valve body. These characteristics make assembly, service, and reconfiguration of the valve a simple and quick operation.

Each check valve subassembly includes a base with an aperture therethrough, a pivotally mounted clapper adapted for engagement and disengagement over the aperture, and a pivotally mounted cam arm overlying the clapper. The cam arm is spring biased toward a closed position, maintaining the clapper in a closed, or engaged position over the aperture until a predetermined amount of fluid pressure is applied to the clapper. As the clapper begins to move toward an open position in response to increasing fluid pressure, the distal edge of the clapper forceably engages a surface on the cam arm, effecting rotation of the cam arm toward an open position. The cooperation between the clapper and the cam arm provides differential loading of the clapper in response to increasing flow rates for the fluid. As a consequence, beneficial reduced fluid pressure losses over the operating flow rates for the valve are realized.

Two embodiments of the check valve subassembly are disclosed, one using a torsion spring for applying spring bias to the cam arm, and the other employing a tension spring for the same purpose. Most of the parts used in both embodiments, including the base and the clapper, and the cam arm in the second embodiment, are fabricated from plastic or rubber material. The cam arm in the first embodiment, the springs, and the pivot shafts are manufactured from stainless or plated steel.

DETAILED DESCRIPTION OF THE PREFERRED EMBODIMENT

Figure 1:
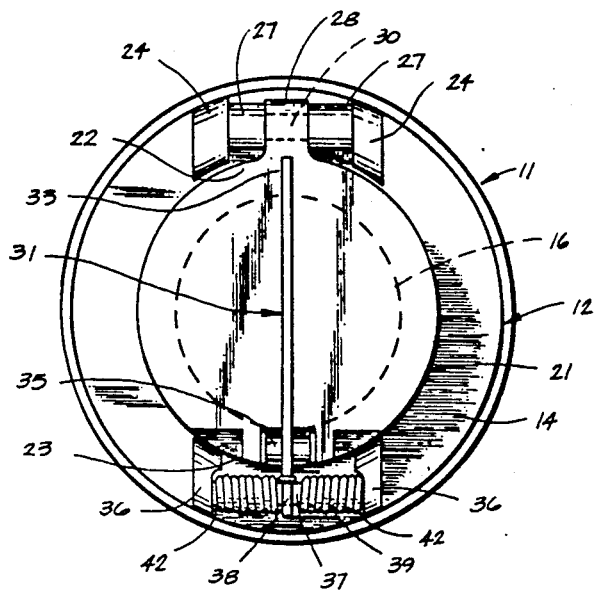
FIG. 1 is an end elevational view of the outlet side of a check valve subassembly.
Figure 2:
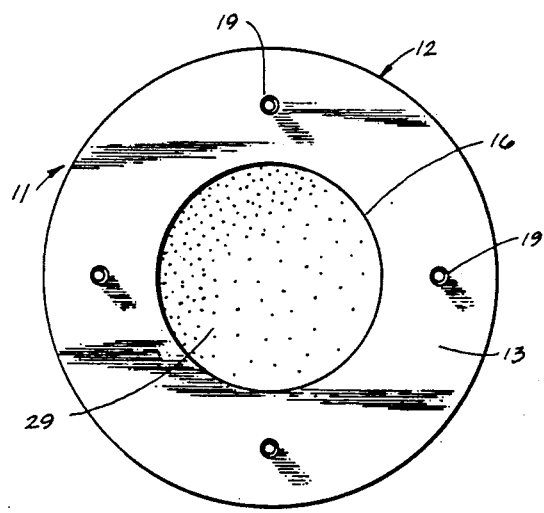
FIG. 2 is an end elevational view of the inlet side of a check valve subassembly.
Figure 3:
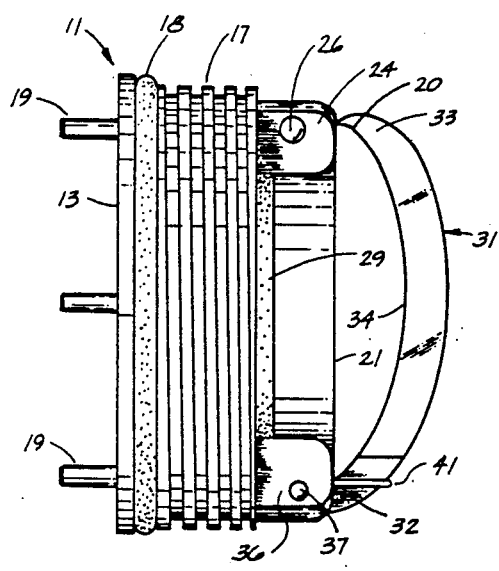
FIG. 3 is a side elevational view of a check valve subassembly.

A check valve subassembly, generally designated by the numeral 11, includes a ring-like base 12 having an inlet side 13, an outlet side 14, and a circular aperture 16 for the flow of fluid therethrough. Base 12 is also provided with circumferential threads 17, for securing the subassembly within a check valve body or housing, to be described more fully below. It is also contemplated that a bayonet mount, a retaining collar, or tabs engaged by the check valve body may be used to secure the subassembly. An 0-ring 18 is provided around the base, adjacent the inlet side 13, for sealing engagement with the check valve housing. A plurality of pins 19, protruding from the inlet side of the base, provides a convenient grip for rotating the subassembly during installation and removal.

A clapper 21, having a proximal edge 22 and an opposing distal edge 23, is pivotally mounted to the outlet side 14 of the base, for rotation about a first axis. For that purpose, a first pair of lugs 24, spanned by a shaft 26 including spacers 27, is provided on side 14 adjacent aperture 16. Also, a boss 28, having a bore 30 for accommodating the shaft 26, is located on the proximal edge of the clapper for rotational engagement with the shaft. A resilient sealing disc 29 is attached to the underside of the clapper to provide a fluid tight seal over the aperture, when the clapper is in a closed or engaged position.

The check valve subassembly 11 also includes a cam arm 31, having a fixed end 32, a movable end 33, and a cam surface 34 therebetween, facing the underlying clapper 21. The configuration of the cam surface disclosed herein is concave and generally elliptical in nature. However, this surface may be modified to other configurations, providing corresponding operating characteristics well known to those skilled in the art.

A pivotally mounted roller 35 may be mounted on the distal end 23 of the clapper, for rolling engagement with the cam surface 34. A second pair of lugs 36 is located on the outlet side 14 of the base, across the aperture from the first pair of lugs 24. A shaft 37 extends between lugs 36, along a second axis parallel to the first axis. A hole 38 is provided in the fixed end 32 of the cam arm for pivotal attachment to the shaft, allowing rotation of the cam arm about the second axis from a closed position to an open position.

A torsion spring 39 is provided around the portion of the shaft 37, exposed between the lugs 36. The median portion of the spring 39 has a loop 41, which engages the cam arm adjacent its fixed end 32. Ends 42 of the torsion spring impinge upon the outlet side 14 of the base, effectively immobilizing the ends of the spring when torsional forces are applied. The torsion spring is assembled in conjunction with the cam arm so as to provide a resilient bias of the cam arm toward a closed position, thereby maintaining the underlying clapper in a normally closed position.

The bias forces provided by the torsion spring are such that when a predetermined amount of pressure is applied from fluid flowing against the clapper from the inlet side, the bias is overcome and fluid is allowed to flow through the partially uncovered aperture. As the fluid flow rate is increased, the clapper continues to pivot outwardly, progressively uncovering the aperture. Concurrently, the roller 35 on the edge 23 of the clapper, travels along the cam surface to the extent allowed by the interaction between the fluid pressures upon the clapper and the opposing bias provided by the torsion spring. A sharply curved portion 20 of the cam surface acts as a limit stop to prevent over-extension of the clapper and the cam arm.

Owing to the varying moment arm created by the clapper working against the arcuate surface of the biased cam arm, the clapper opens differentially in response to increasing flow rates. As will be explained and illustrated more fully below, the differential action of the clapper provides reduced head or pressure loss through the check valve over the range of working flow rates, typically encountered.

Figure 4:
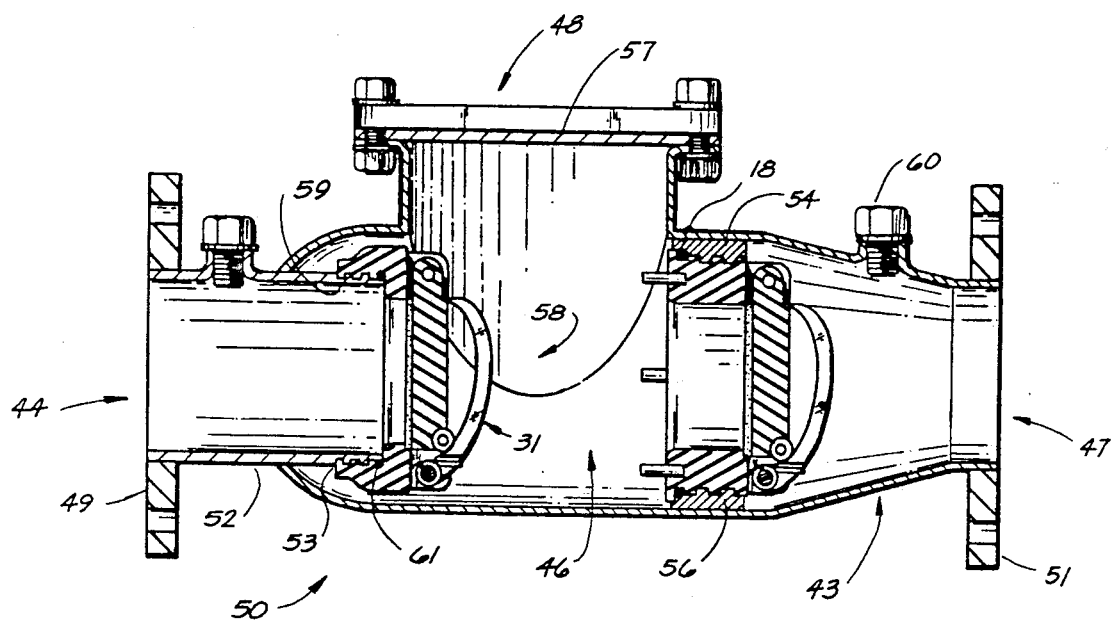
FIG. 4 is a median, longitudinal cross-sectional view of a double check valve, showing the clappers in a closed, engaged position.
Figure 5:
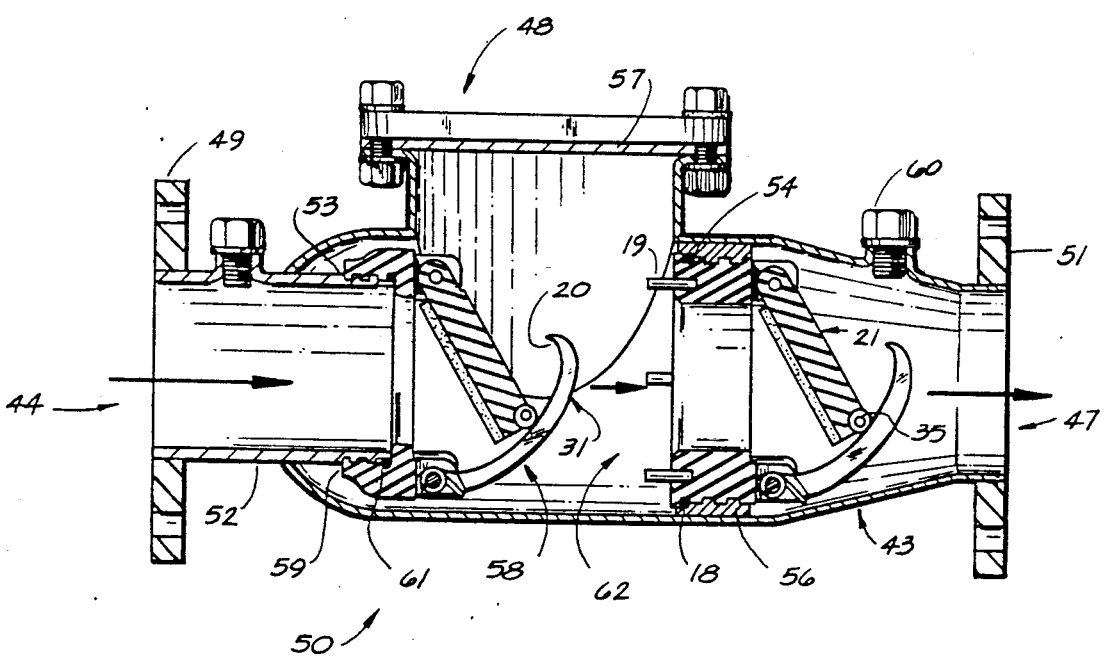
FIG. 5 is a median, longitudinal cross-sectional view of a double check valve, showing the clappers in an open, disengaged position.

Although the check valve subassembly of the present invention may be installed within a variety of housings, including the conventional multi-sectional cast variety, it is preferable to use a unibody 43, or unitized valve body construction. FIG. 4 depicts a double check valve 50 using such a unitized valve body construction; as is evident, the check valve is in a static condition, with no fluid flowing through the body. FIG. 5, on the other hand, illustrates the same valve in a fully operational and dynamic condition, passing fluid at a moderate rate.

The pair of check valve subassemblies used in the double check valve 50, is essentially identical in construction and operation to the subassemblies 11, described above. However, one of the subassemblies is modified slightly for this application, in a manner to be described more fully below.

The unibody 43 as employed herein includes an inlet port 44, a central chamber 46, an outlet port 47, and a service port 48. The inlet port 44 includes a circular flange 49 for attachment to an upstream isolation valve or a section of pipe, and the outlet port 47 includes a similar flange 51 for like downstream attachments. The inlet port 44 also includes inlet pipe 52, having external threads 53 on its innermost portion. Similarly, outlet port 47 includes outlet insert 54, having internal threads 56 as shown in FIGS. 4 and 5.

During initial assembly, servicing, or reconfiguring the check valve from single to double or double to single check valve operation, a cap or cover 57 is removed from the service port 48. Having removed the cap 57, the central chamber is readily accessible for installing or removing check valve subassemblies therein.

An upstream check valve subassembly 58 is modified from the previously described subassembly 11, by providing internal threads 59 in the aperture, for threaded attachment of the subassembly to the inlet pipe. Also, the pins 19 are eliminated from the inlet side of the base, as unnecessary. For installation of the subassembly 58, it is simply passed through the service port and hand threaded onto the inlet pipe 52. An internal 0-ring 61 provides a fluid tight seal, once the base is snugly seated against the end of the pipe 52. The particular rotational orientation of the subassembly is not critical, as it will operate in essentially the same fashion regardless of its end rotational position. This provides advantages over check valve constructions that rely on gravity for proper operation, as such valves must be installed and maintained in a particular orientation.

In like fashion, a downstream check valve subassembly 62 is inserted through the service port and threaded within the outlet insert 54. A bar or other tool (not shown), may be used to engage pins 19, to effect further rotation of subassembly 62 into full engagement with the insert 54. Cap 57 is then replaced over the service port, and the check valve is ready for use. At such time as the check valve requires servicing, or modification of the mode of operation is desired, from a double to single or single to double valve operation, the cap 57 is simply removed again and the desired procedure can be carried out on the valve subassemblies.

It should be noted that the torsion springs 39 of the subassemblies 58 and 62 are tailored to the particular application and configuration of the check valve 50. For example, a single check valve construction would use a torsion spring that provided little, or no (measurable), fluid pressure loss through the valve. The double check valve assembly 50 would employ torsion springs in each subassembly that would cause a 1 to 3 psi fluid pressure loss through each subassembly. If a double check valve assembly further included a pressure relief valve, operating on the reduced pressure ("RP") principle, the relief valve would have an inlet line in communication with the inlet port 44, an chamber line in communication with the central chamber 46, in a manner well known in the art. In this application, the torsion spring of upstream check valve subassembly 58 should exhibit a fluid pressure loss differential from 5 to 9 psi, to ensure proper operation of the pressure relief valve. The torsion spring of the downstream check valve subassembly 62, however, should show a pressure loss differential of 1 to 3 psi for this application. As a matter of convenience, test cock fittings 60 may be provided in the valve housing, to monitor fluid pressure for static, dynamic, normal flow or reverse flow conditions.

Figure 6:
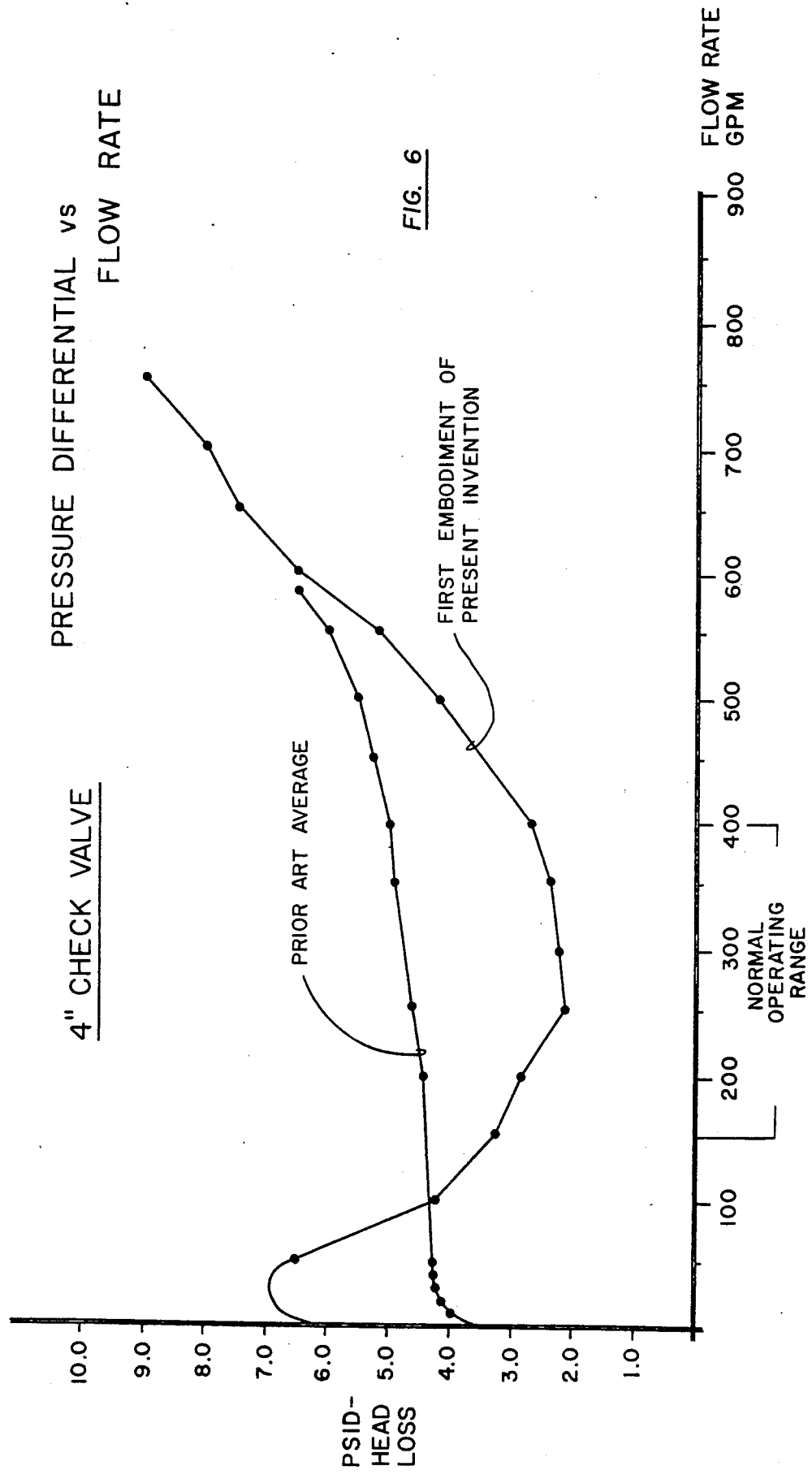
FIG. 6 is a graph showing a comparison between a typical prior art check valve and the present invention, plotting pressure loss differential versus fluid flow rate.

FIG. 6 shows a graph, plotting PSID, or pressure differential (loss) per square inch, versus FLOW RATE, in gallons per minute. One curve shows the prior art, industry average, and the other curve reflects the performance of a double check valve assembly embodying the present invention. Also indicated on the graph is the typical operating range of a 4" check valve of the present invention, ranging from 150 gpm to 400 gpm. The prior art curve reflects a relatively low psi differential at low flow rates, which slowly but steadily increases at greater flow rates.

The curve of the present invention shows a relatively high psi differential at initially low flow rates, and then a sharp decline in psi differential through 250 gpm, followed by a fairly slow rise in differential throughout the remainder of the operating range. In other words, through a significant portion of the operating range of the present invention, an increase in flow rate effects a decrease in the psi differential caused by the check valve. And, throughout the remainder of the operating range, the present invention displays a lower psi differential than the average differential of prior art devices.

Figure 7:
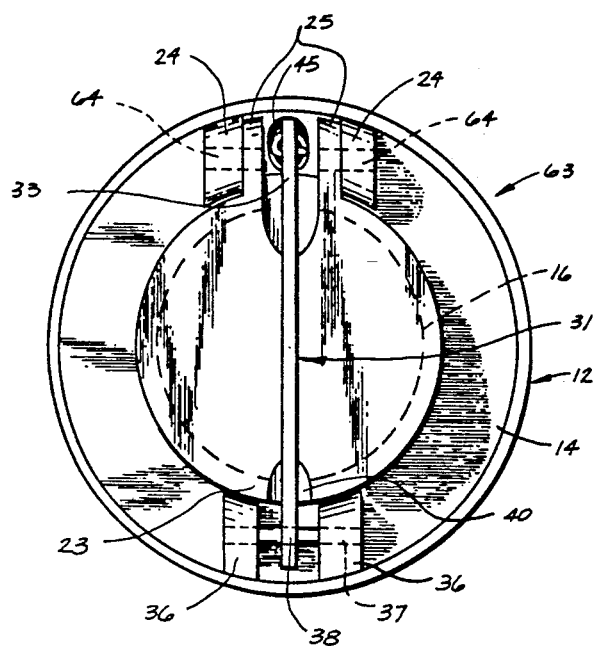
FIG. 7 is an end elevational view of an alternative embodiment of a check valve subassembly, showing the outlet side.
Figure 8:
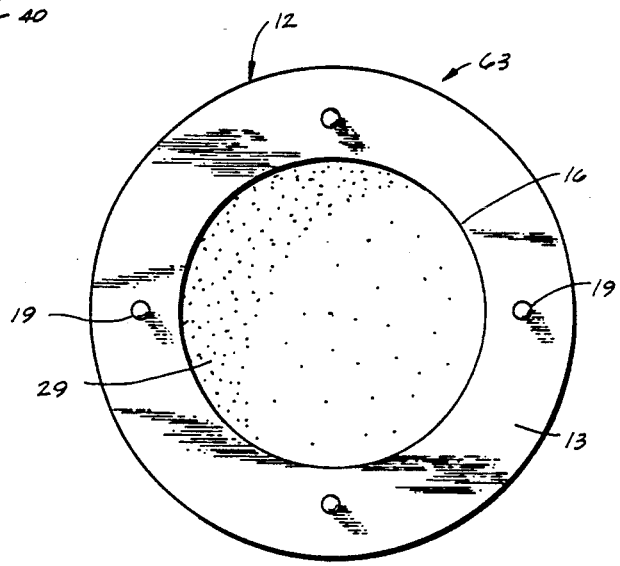
FIG. 8 is an end elevational view of the subassembly depicted in FIG. 7, showing the inlet side.
Figure 9:
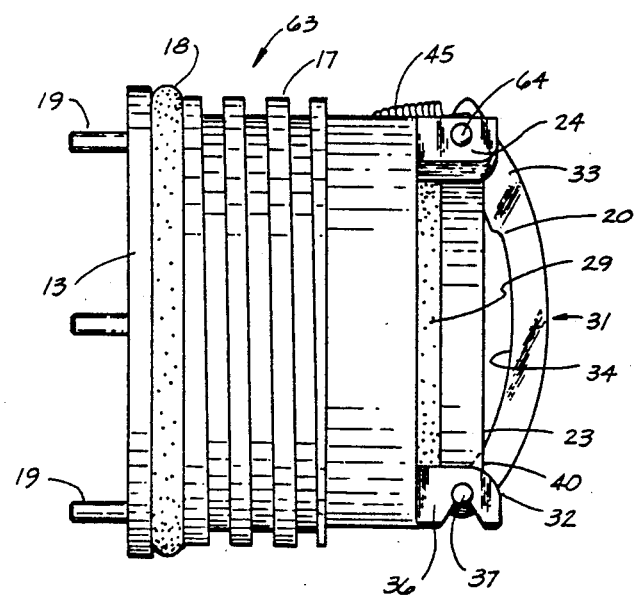
FIG. 9 is a side elevational view of the subassembly depicted in FIG. 7.

Turning now to FIGS. 7, 8, and 9, a second embodiment of the invention is illustrated. This embodiment has been manufactured and tested for smaller diameter check valves, on the order of ¾" to 1", but the disclosure of this embodiment is not limited to such applications. For purposes of convenience, the same numerical identifications of elements will be used, whenever possible, in identifying the structure of the second embodiment as were used in describing the first embodiment.

The second embodiment of the check valve subassembly is generally designated by the numeral 63. Check valve subassembly 63 includes a base 12, having an inlet side 13 and an outlet side 14. An aperture 16 is provided in the base for the passage of fluid from the inlet side to the outlet side. Threads 17 are included around the base 12, adjacent the inlet side, for securing the subassembly 63 within a check valve body. 0-ring 18 is included to provide a fluid tight seal between the subassembly and the valve body. Pins 19, described previously, may be used to advantage when installing and removing the subassembly.

Clapper 21 includes a proximal edge 22 and an opposing distal edge 23. A resilient sealing disc 29 is attached to the underside of clapper 21, to provide a hydraulic seal with the underlying aperture when the clapper is in a closed position (see FIG. 9). A first pair of lugs 24 is located on the outlet side 14 of the base, and is pivotally attached to the clapper by a complimentary pair of ears 25 and a pair of rods 64. Clapper 21 is thereby pivotally mounted for rotational movement about a first axis, from a closed position over the aperture 16 to an open position at least partially uncovering the aperture.

A cam arm 31, has a fixed end 32, a movable end 33, and a cam surface 34 extending between the ends for sliding engagement with the distal edge 23 of the clapper 21. A recess 40 is provided in the distal edge 23, partially to accommodate the cam arm when it is in a closed position, and also to facilitate smooth sliding engagement between the clapper and the cam surface. In the small diameter application of the check valve subassembly 63, it has been determined that both the clapper and the cam arm may be manufactured from plastic material, having a relatively low coefficient of friction. In using such material, it is possible to eliminate the roller 35, used in the first embodiment of the invention.

A second pair of lugs 36 is located on the outlet side of the subassembly base, across the aperture from the first pair of lugs 24. A shaft 37 extends between the lugs 36, through a hole 38 in the fixed end 32 of the cam. Shaft 37 thereby defines a second axis, parallel to the first axis, about which the cam is pivotally mounted for rotation from a closed position to an open position.

Figure 10:
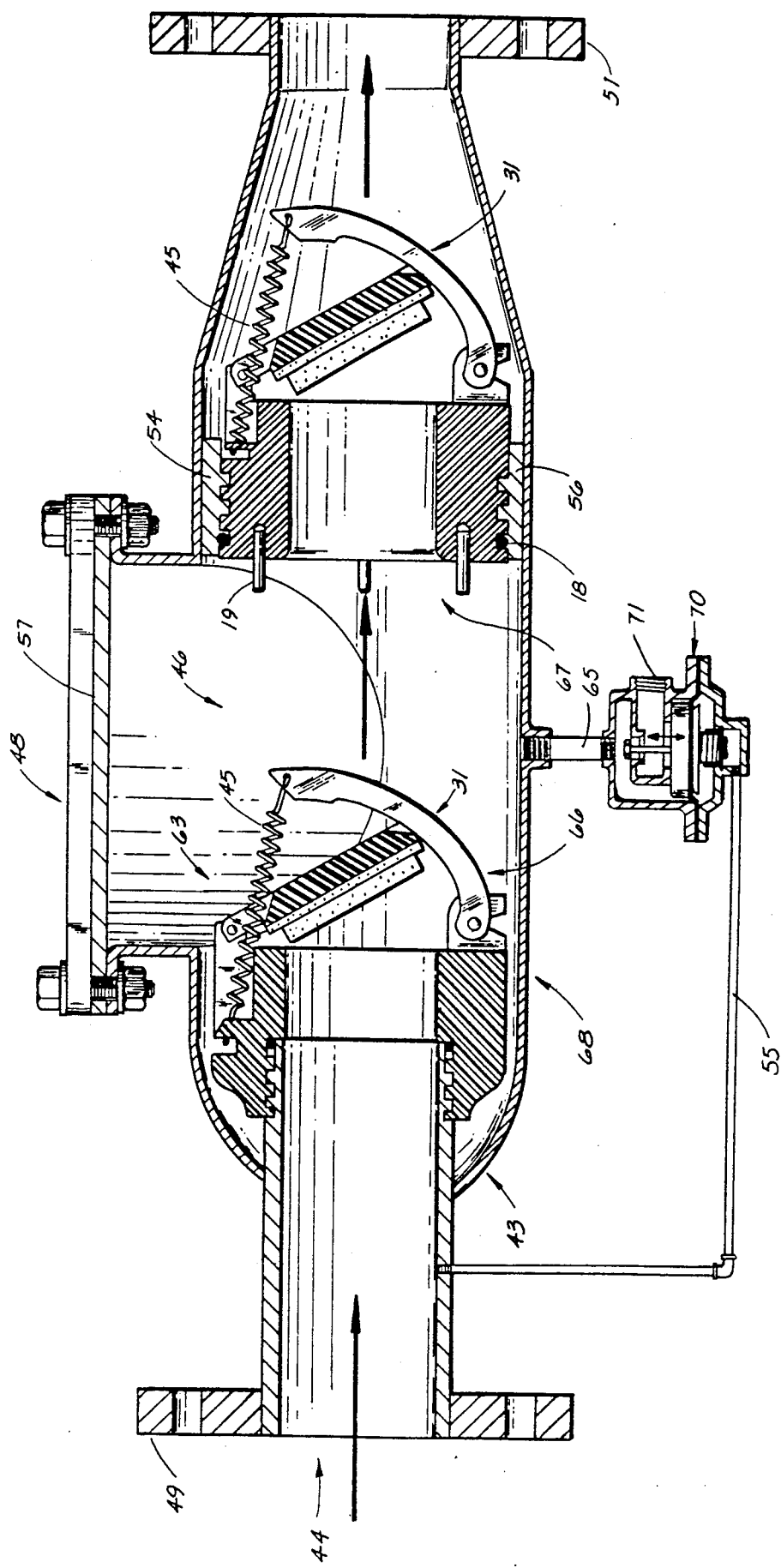
FIG. 10 is a median, longitudinal cross-sectional view of a double check valve and a pressure relief valve, using the alternative check valve subassemblies, showing the clappers in a partially disengaged position; and, FIG. 11 is a graph depicting the typical performance of a check valve using the alternative embodiment check valve subassembly, over a range of flow rates for various check valve diameters.
Figure 11:
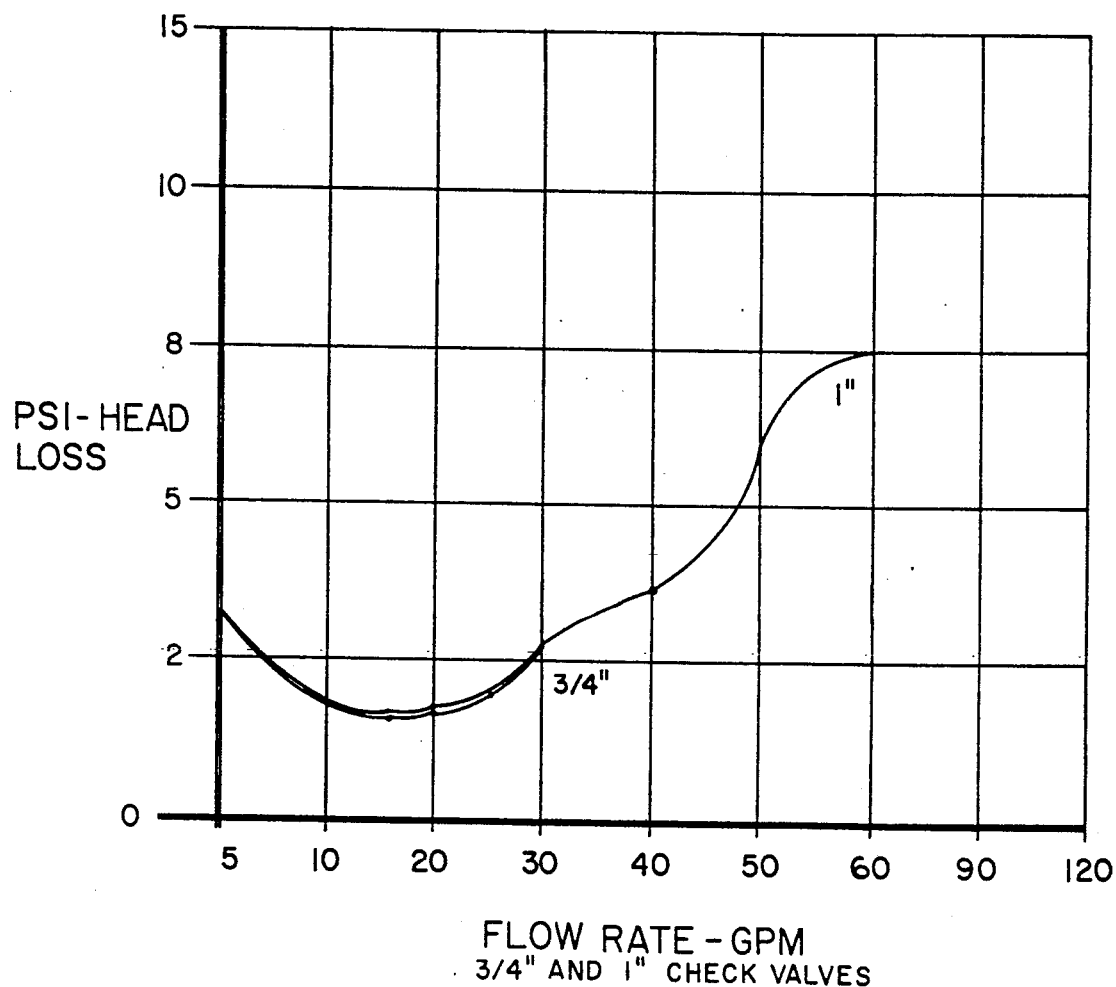

A tension spring 45 extends between the movable end 33 of the cam arm and the base. The spring 45 thereby provides a resilient bias against the cam arm and the underlying clapper, to maintain them in a normally closed position. However, as with the first embodiment of the invention, when a predetermined amount of fluid pressure is imposed upon the inlet side of the base, the bias will be overcome, and both the clapper and the cam arm will pivot away from the outlet side of the base, as shown in FIG. 10. Limit stop 20 prevents over-extension of the clapper and the cam arm in response to increasing flow rates.

An upstream check valve subassembly 66 and a downstream check valve subassembly 67 are shown in a partially open position within the unibody valve housing 43, shown in FIG. 10. As the structure of the double check valve 68 is essentially identical to the double check valve shown in FIGS. 4 and 5, with the exception of the already discussed differences between the internal subassemblies, the common elements will not be mentioned further.

The double check valve shown in FIG. 10 does include a pressure relief valve 70, an inlet line 55, and a central chamber line 65. Pressure relief valve 70 is of conventional design, being adapted to discharge water through port 71 whenever the pressure differential between the inlet port 44 and the central chamber 46 does not exceed approximately 3 psi. Since upstream check valve subassembly 66 is designed to exhibit a fluid pressure loss differential within a range of 5 to 9 psi, a pressure differential of only 3 psi or less would indicate a faulty valve 66. The discharge of water through port 71 brings this particular fault condition to the attention of an inspector.

It will be appreciated, then, that two embodiments of a differentially loading check valve subassembly, both alone and in combination with two unitized check valve body constructions, have been disclosed herein.

What is claimed is:

1. A differentially loading fluid check valve subassembly, comprising:
   a. a base, having an inlet side and an outlet side, and an aperture extending therethrough;
   b. a clapper having a proximal edge and an opposing distal edge;
   c. first means for pivotally mounting said proximal edge of said clapper about a first axis, said first means being located on said outlet side of said base adjacent said aperture for movement of said clapper from a closed position over said aperture to an open position at least partially uncovering said aperture;

d. a cam arm having a fixed end, a movable end and a cam surface therebetween for engagement with said distal edge of said clapper;

e. second means for pivotally mounting said fixed end of said cam about a second axis parallel to said first axis, said second means being located on said outlet side of said base across said aperture from said first pivot means for movement of said cam arm from a closed position to an open position;

f. means for biasing said cam toward a closed position, said biasing means being overcome by a predetermined amount of pressure from fluid flowing through said aperture, and thereafter differentially loading said clapper in response to increasing flow rates.

2. A device as in claim 1, wherein said biasing means includes a torsion spring connected to said arm adjacent said fixed end.

3. A device as in claim 2, including a roller pivotally mounted on said distal edge of said clapper, for rolling engagement with said cam surface.

4. A device as in claim 1, wherein said biasing means includes a tension spring extending between said movable end of said arm and said base.

5. A device as in claim 4, including a limit stop on said cam surface to prevent the further opening of said clapper beyond a predetermined extent.

6. A device as in claim 4, wherein said cam surface and the portion of said distal edge of said clapper engaging said surface have a sufficiently low coefficient of friction therebetween to allow smooth opening and closing of said clapper.

7. A differential loading fluid check valve comprising:

a. a valve body for the passage of fluid, including an inlet port, an outlet port, a chamber intermediate said ports, a service port in communication with said chamber, and a removable cover over said service port, giving selective access to said chamber;

b. a base, having an inlet side, an outlet side, and an aperture extending therethrough, and further including means for mounting said base transversely within said chamber, for the flow of fluid through said aperture;

c. a clapper having a proximal edge and an opposing distal edge;

d. first means for pivotally mounting said proximal edge of said clapper about a first axis, said first means being located on said outlet side of said base adjacent said aperture for movement of said clapper from a closed position over said aperture to an open position at least partially uncovering said aperture;

e. a cam arm, having a fixed end, a movable end, and a cam surface therebetween for engagement with said distal edge of said clapper;

f. second means for pivotally mounting said fixed end of said cam about a second axis parallel to said first axis, said second means being located on said outlet side of said base across said aperture from said first pivot means for movement of said cam arm from a closed position to an open position;

g. means for biasing said cam arm toward a closed position, said biasing means being overcome by a predetermined amount of pressure from fluid flowing through said aperture, and thereafter differentially loading said clapper in response to increasing flow rate.

8. A device as in claim 7, wherein said biasing means includes a torsion spring extending between said arm adjacent said fixed end and said base.

9. A device as in claim 8, including a roller pivotally mounted on said distal edge of said clapper, for rolling engagement with said cam surface.

10. A device as in claim 7, wherein said biasing means includes a tension spring extending between said movable end of said arm and said base.

11. A device as in claim 10, including a limit stop on said cam surface to prevent the further opening of said clapper beyond a predetermined extent.

12. A device as in claim 10, wherein said cam surface and the portion of said distal edge of said clapper engaging said surface have a sufficiently low coefficient of friction therebetween to allow smooth opening and closing of said clapper.

13. A device as in claim 7 wherein said valve body is of unitized construction.

14. A device as in claim 13 wherein said valve body is constructed of stainless steel.

15. A differential loading fluid check valve comprising:

a. a valve body for the passage of fluid including an inlet port, an outlet port, a chamber intermediate said ports, a service port in communication with said chamber and a removable cover over said service port, giving selective access to said chamber;

b. an upstream check valve subassembly and a downstream check valve subassembly, each of said subassemblies including:

i. a base having an inlet side, an outlet side, and an aperture extending therethrough;

ii. a clapper having a proximal edge and an opposing distal edge;

iii. first means for pivotally mounting said proximal edge of said clapper about a first axis, said first means being located on said outlet side of said base adjacent said aperture, for movement of said clapper from a closed position over said aperture to an open position at least partially uncovering said aperture;

iv. a cam arm, having a fixed end, a movable end, and a cam surface therebetween for engagement with said distal edge of said clapper;

v. second means for pivotally mounting said fixed end of said cam about a second axis parallel to said first axis; said second means being located on said outlet side of said base across said aperture from said first pivot means for movement of said cam arm from a closed position to an open position;

vi. means for biasing said cam arm toward a closed position, said biasing means being overcome by a predetermined amount of pressure from fluid flowing through said aperture, and thereafter differentially loading said clapper in response to increasing flow rate;

c. means for mounting said base of said upstream check valve subassembly transversely within an upstream portion of said chamber, for the flow of fluid through said aperture of said upstream check valve subassembly;

d. means for mounting said base of said downstream check valve subassembly transversely within a downstream portion of said chamber, for flow of fluid through said aperture of said downstream check valve subassembly.

16. A device as in claim 15 in which said bias means of said upstream check valve subassembly provides a greater pressure loss differential for fluid flowing therethrough, than the pressure loss differential provided by said bias means of said downstream check valve subassembly.

17. A device as in claim 16 in which said pressure loss differential for said upstream check valve subassembly is in the range of 5 to 9 psi, and said pressure loss differential of said downstream check valve subassembly is in the range of 1 to 3 psi.

18. A device as in claim 17 further including a pressure relief valve having an inlet line in communication with said inlet port, and an chamber line in communication with said chamber.

* * * * *